May 17, 1960 A. P. KUNDROTAS 2,937,236

FAST-SWITCHING TRANSISTOR TELEGRAPH REPEATER

Filed March 23, 1956

United States Patent Office 2,937,236
Patented May 17, 1960

2,937,236

FAST-SWITCHING TRANSISTOR TELEGRAPH REPEATER

Alexander P. Kundrotas, Chicago, Ill., assignor to International Telephone and Telegraph Corporation, New York, N.Y., a corporation of Maryland Application March 23, 1956, Serial No. 573,549

5 Claims. (Cl. 178—70)

This invention relates to a fast-switching transistor telegraph repeater. Its general object is to provide a circuit arrangement using transistors as switching elements to supply D.C. output current which will satisfactorily operate a teletypewriter at high speed. The specific object is to provide an arrangement in which the output current will rise from "off" to a required value rapidly, into the high inductance load provided by the teletypewriter select magnet.

A rapid rise of current through an inductive load may be obtained by applying a high voltage to oppose the voltage induced in the load by the changing current flow. One method of doing this is to use a power source of a much higher voltage than is necessary to give the desired steady-state current, with a resistor in series to limit the steady-state current to the required value. But if transistors are used in the switching device, the steady supply voltage which may be used is limited by the properties of the transistors, and the requirements of the circuit. The supply voltage permissible is not high enough to provide satisfactory operation at the desired speed.

According to the invention, the necessity of using a high voltage power supply is avoided by using an inductor to supply an induced voltage which aids the supply voltage during the transition period of rising output current. The switching circuit comprises two transistors, one in an auxiliary path and the other in the output path, which are controlled by input signals to conduct alternately. The inductor is connected in the auxiliary path to build up a magnetic field while the output current is off, and is switched to connection in the output path during the flow of output current, causing the magnetic field to partially collapse and induce a voltage which opposes the voltage induced in the load by the rising current, thereby aiding the output current to rise rapidly.

The foregoing and other objects and features of this invention and the manner of attaining them will become more apparent and the invention itself will be best understood, by reference to the following description of an embodiment of the invention taken in conjunction with the accompanying drawings comprising Figs. 1 to 4, wherein.

*Detailed description*

Figures 1, 2, 3, 4:
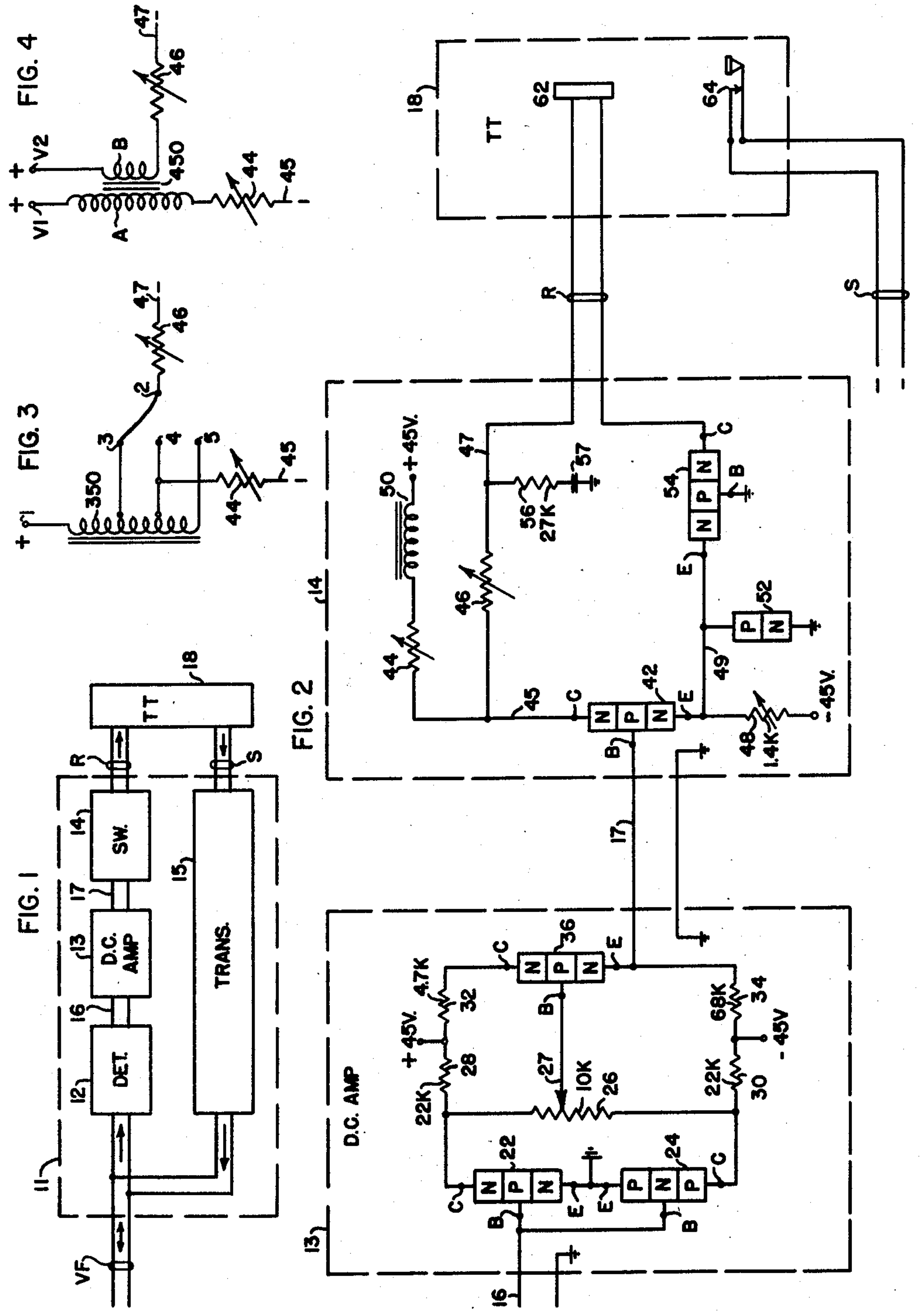
Fig. 1 shows a telegraph-terminal coupler between a voice-frequency line and a D.C. teletypewriter.
Fig. 2 shows a D.C. amplifier and switch unit in the receiving section of the coupler, for controlling current to the select magnet of the teletypewriter.
Figs. 3 and 4 show alternative embodiments of a portion of the switch unit.

Fig. 1 illustrates a telegraph-terminal coupler 11 between a voice-frequency line VF and a D.C. teletypewriter 18. D.C. output signals sent from teletypewriter 18 over line S are converted by the transmitting section 15 to voice-frequency telegraph signals for transmission over line VF. Voice frequency telegraph signals received from line VF are amplified and converted to D.C. signals in detector 12, and are amplified in a D.C. amplifier 13 and switch unit 14 to control the current over line R to the teletypewriter 18. The signals comprise mark and space signals alternately. D.C. current on line R flows while the received signals are in mark condition; and does not flow during the space condition.

Referring to Fig. 2, the teletypewriter 18 includes a receiving select magnet 62 connected to line R and send contacts 64 connected to line S. Junction transistors are used in the units 13 and 14 to amplify the D.C. signals which operate the select magnet 62.

The first stage of amplifier 13 is a temperature compensated D.C. amplifier comprising two transistors 22 and 24 which are of opposite conductivity type. The input from line 16 is connected to the two base terminals in parallel, and the output is taken from the tap of resistor 26 which is connected between the collector terminals. Power is supplied through resistors 28 and 30. The tap 27 is connected to the base terminal of a transistor 36, with output taken from the emitter terminal to line 17. This transistor has its collector terminal connected through a resistor 32 to the positive supply terminal, and the emitter terminal through a resistor 34 to the negative supply terminal.

The switch unit 14 is a D.C. amplifier generally similar to the one described in the U.S. patent application by Arthur J. Radcliffe, Jr., and Arthur R. Denz, Serial No. 493,512, filed March 10, 1955, for a Direct-Current Transistor Amplifier. The unit 14 comprises an input transistor 42 and an output transistor 54, both NPN junction type. The input from line 17 is connected to the base terminal of the input transistor 42. The base terminal of output transistor 54 is grounded. The emitter terminals of the two transistors are connected together by wire 49, and through resistor 48 to the negative 45-volt terminal of the power supply. A junction diode 52 is connected with its positive terminal to wire 49 and its negative terminal grounded. Wire 49 has a very low resistance to ground, through diode 52 or the emitter diode of transistor 54 depending upon whether its potential is positive or negative, and is therefore limited to a low potential to ground. Also, when the emitter diode of transistor 42 is biased in its low-resistance forward direction, the potential of its emitter terminal tends to follow that of its base terminal.

By supplying a small signal on line 17 to the base terminal of transistor 42, a relatively large current may be controlled through transistor 54. When the signal potential on line 17 is more negative than wire 49, transistor 42 is blocked; and current may flow from the negative supply terminal, through resistor 48 to transistor 54. Current then flows in the output circuit path from the collector terminal of transistor 54, over line R and through the select magnet 62, thence to wire 47, through resistors 46 and 44 and inductor 50, to the positive 45-volt terminal of the power supply.

When the signal potential on line 17 is positive, current flows through transistor 42. The collector terminal of transistor 42 is connected to the positive supply terminal through resistor 44 and inductor 50. The current through transistor 42 is large compared to the signal current on line 17, as determined by the current-amplification factor, beta. If the current flow is sufficient, wire 49 becomes positive, and current flow in transistor 54 is blocked.

Signal potentials over a small range near ground on line 17 will cause current to flow in both transistors. Each transistor is operated at cutoff or saturation current except during the transition period. The amplitude of signals on line 17 should be large, to keep the period during which the potential is in the transition range short.

A mark signal appears as a negative potential on line 17 which blocks transistor 42, and causes output current to flow through transistor 54 to operate select magnet 62. The value of this current depends on the setting of resistors 44, 46 and 48. A space signal appears as a positive potential on line 17 which causes auxiliary current to flow through transistor 42, and blocks the output current through transistor 54. The value of the auxiliary current depends on the setting of resistors 44 and 48.

For good operation of the teletypewriter 18, it is required that the transition between no current and full current flow on line R, corresponding to space and mark signals, be rapid and symmetrical. But select magnet 62 has a high inductance, and the change of current causes a high voltage to be induced in it which opposes the change. During the transition from full to no output current, the reverse resistance of the collector diode of transistor 54 is high, until the reverse voltage exceeds the Zener voltage. If a transistor is selected with a high Zener voltage, the current is cutoff sufficiently fast. But a fast rise from no to full output current requires a source of high voltage to oppose the induced voltage in the select magnet 62. The voltage which may be applied to the transistors is limited, and this limits the value of the supply voltage.

According to the invention, the correcting inductor 50 is used as a source of high voltage to aid the rise in value of the output current. The auxiliary current flow through transistor 42, resistor 44, and inductor 50 during space signals, builds up a magnetic field in inductor 50. The output current flow through transistor 54, select magnet 62, resistors 46 and 44, and inductor 50 during mark signals, establishes a magnetic field in select magnet 62 and inductor 50. The auxiliary current is set to a higher value than the output current required to operate the select magnet, so that, during the transition from space to mark signals, the flux in inductor 50 is reduced, and the change of flux induces a voltage in series in the output path which aids the positive 45-volt supply source to build up the output current. The resistor 56 and condenser 57 connected in series between wire 47 and ground act to filter or tune the output current flow and improve the wave form.

*Embodiments of Figs. 3 and 4*

It seems probable that under some conditions the inductance in the output path of the correcting inductor should match the inductance of the select magnet. Also, it may be desirable that the number of turns of the correcting inductor effective in the output path be different than the effective number of turns in the auxiliary path. Alternative embodiments are shown in Figs. 3 and 4 for accomplishing this.

In Fig. 3, the inductor 350 has a winding between the positive terminal 1 and terminal 5, with intermediate taps to terminals 3 and 4. The resistor 44 is connected in the auxiliary path between the tap to terminal 4 and wire 45; and the resistor 46 in the output path is connected to a terminal 2. By connecting a jumper from terminal 2 to one of terminals 3, 4, or 5, the number of turns in the output path may be less than, equal to, or more than the number of turns in the auxiliary path. Another possibility is to wind the turns between terminals 1 and 4 in one direction, and the turns between terminals 4 and 5 in the opposing direction, with the jumper between terminals 2 and 5.

Fig. 4 shows an inductor 450 with two separate windings. The auxiliary winding A is connected from a positive terminal V1, through resistor 44, to wire 45; and the output winding B is connected between a positive terminal V2 and resistor 46. Terminals V1 and V2 may be at different values of supply voltage.

In each of the embodiments shown, operation is essentially similar. The number of turns in each winding, the value of each current, and the voltages used are determined by factors such as the capabilities of the transistors, the output requirements, operating charcteristics, and cost. The auxiliary current may be less than the output current under some conditions, but the number of ampere-turns in the auxiliary winding during space signals should be greater than the number of ampere-turns in the output winding during mark signals at the value of output current required to operate the select magnet, to obtain a decrease in flux in the inductor during the space to mark transition period.

While I have described above the principles of my invention in connection with specific apparatus, it is to be clearly understood that this description is made only by way of example and not as a limitation to the scope of my invention.

I claim:

1. In combination, an inductive load device in which a voltage is induced opposing any change of current flow through it, a direct-current supply source, a transistor switching device, a source of input signals comprising alternate first and second signals, an inductor, circuit elements comprising an output circuit path including the inductive load device and comprising an auxiliary circuit path excluding the inductive load device, each circuit path including the supply source and at least a portion of the inductor, transistor means in the switching device for selectively closing the auxiliary and output paths responsive respectively to first and second input signals, with each path being opened responsive to the signal which closes the other path, the self-induced voltage of the inductor responsive to the opening of the auxiliary path upon closure of the output path being effective to aid the voltage of the supply source and oppose the voltage induced in the load device, to thereby increase the rate of rise of output current flow.

2. A combination according to claim 1, wherein the said inductor comprises a single winding of a number of turns connected in the said auxiliary path during the said first input signals, and in the said output path during the said second input signals.

3. A combination according to claim 1, wherein the inductor comprises a tapped winding, with a first number of turns connected in the said auxiliary path during the said first input signals, and a second number of turns connected in the said output path during the said second input signals.

4. A combination according to claim 1, wherein the inductor comprises a first winding connected in the said auxiliary path during the said first input signals, and a second winding connected in the said output path during the said second input signals.

5. A combination according to claim 1, wherein the said transistor switching device comprises a first transistor connected in the said auxiliary path which conducts responsive to the said first input signals and is substantially blocked responsive to the said second input signals, and a second transistor connected in the said output path which is substantially blocked responsive to first input signals and conducts responsive to second input signals.

References Cited in the file of this patent

UNITED STATES PATENTS

| | | |
|---|---|---|
| 1,964,505 | Cummings | June 26, 1934 |
| 2,044,062 | Cummings | June 16, 1936 |

FOREIGN PATENTS

| | | |
|---|---|---|
| 687,205 | Great Britain | Feb. 11, 1953 |